(12) United States Patent
Lee et al.

(10) Patent No.: US 8,588,782 B2
(45) Date of Patent: Nov. 19, 2013

(54) FEMTOCELL ACCESS CONTROL

(75) Inventors: Ki-Ho Lee, Gyeonggi-do (KR); Yong-Gyoo Lee, Seoul (KR); Yung-Ha Ji, Gyeonggi-do (KR)

(73) Assignee: KT Corporation, Gyeonggi-do (KR)

( * ) Notice: Subject to any disclaimer, the term of this patent is extended or adjusted under 35 U.S.C. 154(b) by 0 days.

(21) Appl. No.: 13/447,455

(22) Filed: Apr. 16, 2012

(65) Prior Publication Data

US 2012/0264431 A1  Oct. 18, 2012

(30) Foreign Application Priority Data

Apr. 14, 2011 (KR) .................. 10-2011-0034854

(51) Int. Cl.
*H04W 36/00* (2009.01)
(52) U.S. Cl.
USPC ........... 455/436; 455/437; 455/438; 455/439; 455/440; 455/441; 455/442; 455/443; 455/444; 370/331
(58) Field of Classification Search
USPC .................. 370/331; 455/436–444
See application file for complete search history.

(56) References Cited

U.S. PATENT DOCUMENTS

| | | |
|---|---|---|
| 7,796,514 B2 | 9/2010 | Noriega |
| 8,219,101 B2 | 7/2012 | Shin |
| 8,259,681 B2 | 9/2012 | Lee et al. |
| 2006/0178153 A1 | 8/2006 | Tenny et al. |
| 2008/0081625 A1* | 4/2008 | Ergen et al. ............... 455/436 |
| 2009/0238143 A1 | 9/2009 | Mukherjee et al. |
| 2010/0008324 A1 | 1/2010 | Lee et al. |
| 2010/0015978 A1 | 1/2010 | Yoon et al. |
| 2010/0075679 A1 | 3/2010 | Tenny et al. |
| 2010/0093358 A1 | 4/2010 | Cheong et al. |
| 2010/0113032 A1 | 5/2010 | Lee et al. |
| 2010/0157944 A1 | 6/2010 | Horn |
| 2010/0304777 A1 | 12/2010 | Lee et al. |
| 2011/0013560 A1 | 1/2011 | Zhang et al. |
| 2011/0045834 A1* | 2/2011 | Kim et al. ............... 455/438 |
| 2011/0070889 A1 | 3/2011 | Li |
| 2011/0092214 A1 | 4/2011 | Iwamura |
| 2011/0142004 A1* | 6/2011 | Bae et al. ............... 370/331 |
| 2011/0201311 A1 | 8/2011 | Lee et al. |
| 2011/0212731 A1 | 9/2011 | Lee et al. |
| 2011/0223905 A1 | 9/2011 | Lee et al. |
| 2011/0237258 A1* | 9/2011 | Nylander et al. ........... 455/437 |
| 2012/0028645 A1 | 2/2012 | Kim et al. |
| 2012/0039214 A1 | 2/2012 | Kim et al. |

FOREIGN PATENT DOCUMENTS

| | | |
|---|---|---|
| KR | 10-2005-0068400 A | 7/2005 |
| KR | 10-2005-0121136 A | 12/2005 |
| KR | 10-2007-0110348 A | 11/2007 |
| KR | 10-2008-0026855 A | 3/2008 |

(Continued)

*Primary Examiner* — Olumide T Ajibade Akonai
*Assistant Examiner* — Edward Zhang
(74) *Attorney, Agent, or Firm* — IP Legal Services, LLC

(57) ABSTRACT

The disclosure is related to handover for user equipment between femtocell base stations having different closed subscriber group (CSG) identifiers. A method may be provided for allowing handover of user equipment between base stations belonging to different organizations. The method may include collecting, by a first base station, information corresponding to identifiers of neighbor base stations, selecting handover-allowable base stations from the neighbor base stations having an organization identifier different from that of the first base station, and enabling handover for the user equipment from the first base station to a second base station based on the selected handover-allowable base stations for a handover request of the user equipment from the first base station to the second base station.

17 Claims, 4 Drawing Sheets

(56) References Cited

FOREIGN PATENT DOCUMENTS

| | | |
|---|---|---|
| KR | 10-2008-0080801 A | 9/2008 |
| KR | 10-0920894 B1 | 10/2009 |
| KR | 10-2010-0003664 A | 1/2010 |
| KR | 10-2010-0004833 A | 1/2010 |
| KR | 10-2010-0021156 A | 2/2010 |
| KR | 10-2010-0029869 A | 3/2010 |
| KR | 10-2010-0041236 A | 4/2010 |
| KR | 10-2010-0048841 A | 5/2010 |
| KR | 10-2010-0060353 A | 6/2010 |
| KR | 10-2010-0078520 A | 7/2010 |
| KR | 10-2010-0092397 A | 8/2010 |
| KR | 10-2010-0092742 A | 8/2010 |
| KR | 10-2010-0120075 A | 11/2010 |
| KR | 10-2010-0126776 A | 12/2010 |
| KR | 10-2010-0126818 A | 12/2010 |
| KR | 10-2010-0133821 A | 12/2010 |
| KR | 10-2011-0099327 A | 9/2011 |

* cited by examiner

FEMTOCELL ACCESS CONTROL

CROSS REFERENCE TO PRIOR APPLICATIONS

The present application claims priority under 35 U.S.C.§119 to Korean Patent Application No. 10-2011-0034854 (filed on Apr. 14, 2011), which is hereby incorporated by reference in its entirety.

FIELD OF THE INVENTION

The present invention relates to femtocell access control and in particular, to handover for user equipment between femtocell base stations having different closed subscriber group (CSG) identifiers.

BACKGROUND OF THE INVENTION $3^{rd}$ generation partnership project (3GPP) standards have defined handover specifications between femtocell. In order to provide handover for user equipment from one femtocell to another, the user equipment may transmit a handover request to a femtocell gateway through a serving femtocell base station. In response to the handover request, the femtocell gateway may perform an access check procedure with a mobile management entity (MME) node. During the access check procedure, the femtocell gateway may determine whether to approve the handover request of the user equipment based on an allowed closed subscriber group list (ACL) of the user equipment.

User equipment may store the ACL. The ACL may be information on femtocell base stations that can be accessed. Such information may be a dosed subscriber group (CSG) identifier of a femtocell base station. For example, when a target femtocell base station is configured in a CSG mode, user equipment may need to have a CSG identifier of a target femtocell base station in order to perform handover from a serving femtocell base station to the target femtocell base station. When the CSG identifier of the target femtocell base station is not included in the ACL of the user equipment, the handover request of the user equipment to the target femtocell base station is typically denied. That is, the target femtocell base station allows only user equipment handover from a serving femtocell base station having the same CSG identifier.

The same CSG identifier may be assigned to femtocells and associated femtocell base stations that belong to the same service provider and the same intranet. That is, each femtocell and each femtocell base station may have different CSG identifiers when the femtocell and the femtocell base stations belong to different service providers and different intranets. Accordingly, handover between femtocell base stations of different service providers or different intranets may not be allowed. A femtocell having different CSG identifiers may be referred to as a "hetero" femtocell, In general, a building may include a plurality of hetero femtocells of different service providers. For example, a first femtocell with a first femtocell base station may be located at the first floor, a second femtocell with a second femtocell base station may be located at the second floor and the third floor, and a third femtocell with a third femtocell base station may be located at the fifth floor. The first and third femtocells belong to the same intranet so the first and third femtocells have the same CSG identifier. The second femtocell belongs to a different intranet from that of the first and third femtocells. The second femtocell has the different CSG identifier from that of the first and third femtocells. A user with user equipment accessing the first femtocell or the third femtocell frequently may frequently travel between the first floor and the fifth floor. In this case, the user must pass the second femtocell having a CSG identifier different from that of the first femtocell or the third femtocell. In this case, for a handover sequence between the first femtocell and the second femtocell and between the second femtocell and the third femtocell, the user equipment may frequently be disconnected. Accordingly, with such handover, overall communication quality may be seriously degraded in a communication environment including hetero femtocells gathered in such a small area, such as an office building.

SUMMARY OF THE INVENTION

This summery is provided to introduce a selection of concepts in a simplified form that are further described below in the detailed description with reference to the drawings. This summary is not intended to identify key features or essential features of the claimed subject matter, nor is it intended to limit the scope of the claimed subject matter. Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, user equipment may be allowed to be handed over between femtocell base stations having different CSG identifiers.

In accordance with another aspect of the present invention, femtocell base stations may be enabled to hand over user equipment to another femtocell base station separated in a comparatively short distance but having different CSG identifiers.

In accordance with an exemplary embodiment of the present invention, a method may be provided for allowing handover of user equipment between base stations belonging to different organizations. The method may include collecting, by a first base station, information corresponding to identifiers of neighbor base stations, selecting handover-allowable base stations from the neighbor base stations having an organization identifier different from that of the first base station, and enabling handover for the user equipment from the first base station to a second base station based on the selected handover-allowable base stations for a handover request of the user equipment from the first base station to the second base station.

The collecting information may include scanning and receiving signals transmitted from the neighbor base stations in a listening mode, collecting each identifier including the organization identifier from the scanned signals, and storing the collected identifiers in a memory.

The selecting handover-allowable base stations may include selecting, from the neighbor base stations, base stations having an organization identifier different from the first base station as hetero base stations, selecting, from the selected hetero base stations, base stations having an organization identifier identical to those of the selected hetero base stations, and transmitting a signal with signal intensity greater than reference signal intensity, as the handover-allowable base stations.

The method may include generating a handover acceptance request message to include information on the handover-allowable base stations, and transmitting the generated message to a gateway.

The enabling handover may include transmitting, by the first base station, a handover request message to the gateway when the first base station permits handover of the user equipment from the first base station to the second base station, and performing handover for the user equipment to the second base station having the organization identifier different from that of the first base station upon receipt of a handover approval message from the gateway.

The method may include receiving, by the gateway; the handover acceptance request message, extracting the information on the handover-allowable base stations from the received handover acceptance request message, and storing the extracted information on the handover-allowable base stations. The method may include determining the enabling handover for the user equipment from the first base station to the second base station based on the handover-allowable base stations included in the handover acceptance request message from the first base station when the gateway receives the handover request message from the first base station, The determining the enabling may include detecting a cell identifier of the first base station from the handover request message, comparing an organization identifier of a target base station included in the handover request message with organization identifiers of the handover-allowable base stations stored associated with the first base station, and transmitting the handover approval message to the first base station when one of organization identifier of the handover-allowable base stations is identical to the organization identifier of the target base station in the handover request message.

The organization identifier may be a dosed subscriber group (CSG) identifier.

The base stations may be femtocell base stations, the first base station may be a femtocell base station, and the second base station may be a femtocell base station, In accordance with another embodiment of the present invention, a method may be provided for enabling a femtocell base station to hand over user equipment to another femtocell base station belonging to a different organization. The method may include receiving, by a gateway, a handover acceptance request message from a first base station coupled to the gateway, and determining allowing a handover request from the first base station to a second base station based on information stored in the handover acceptance request message received from the first base station.

The method may further include extracting handover-allowable base station information from the received handover acceptance request message, and storing the extracted handover-allowable base station information associated with identifier information of the first base station.

The handover-allowable base station information may include information on handover-allowable base stations of the first base station, and the handover-allowable base stations may be neighbor base stations of the first base station which have a closed subscriber group (CSG) identifier different from that of the first base station and transmit signals with signal intensity greater than reference signal intensity.

The determining may include receiving the handover request from the first base station to the second base station, detecting a cell identifier of the first base station from the handover request message, comparing a CSG identifier of the second base station included in the handover request message with stored CSG identifiers of the handover-allowable base stations associated with the cell identifier of the first base station, and transmitting a handover approval message to the first base station when one of CSG identifiers of the handover-allowable base stations is identical to the CSG identifier of the target base station in the handover request message.

In accordance with another embodiment of the present invention, a femtocell base station may include a collector, a selection unit, and a handover determination unit. The collector may be configured to collect information corresponding to identifiers of neighbor femtocell base stations. The selection unit may be configured to select handover-allowable base stations from the neighbor femtocell base stations having a organization identifier different from that of the femtocell base station. The handover determination unit may be configured to enable handover for user equipment from the femtocell base station to a second femtocell base station based on the selected handover-allowable base stations when the user equipment requests handover from the femtocell base station to the second femtocell base station, The collector may be configured to scan and receive signals transmitted from neighbor base stations in a listening mode, to collect each identifier including the organization identifier from the scanned signals, and to store the collected identifiers in a memory.

The selection unit may be configured to select, from the neighbor femtocell base stations, one or more neighbor femtocell base stations having an organization identifier different from the femtocell base station as hetero femtocell base stations, to select, from the selected hetero base stations, base stations having an organization identifier identical to those of the selected hetero base stations, and to transmit a signal with signal intensity greater than reference signal intensity, as the handover-allowable base stations.

The femtocell base station may further include a generation unit. The generation unit may be configured to generate a handover acceptance request message to include information on the handover-allowable base stations, and to transmit the generated message to a gateway.

The handover determination unit may be configured to transmit a handover request message to the gateway when determining handing over the user equipment to the second femtocell base station, and to perform handing over the user equipment to the second femtocell base station having the organization identifier different from that of the femtocell base station upon receipt of a handover approval message from the gateway.

The gateway may include an information collector configured to receive the handover acceptance request message, to extract the information on the handover-allowable base stations from the received handover acceptance request message, and to store the extracted information on the handover-allowable base stations, and a handover control unit configured to determine whether to allow handover of the user equipment from the femtocell base station to the second femtocell base station based on the handover-allowable base stations included in the handover acceptance request message from the femtocell base station upon the receipt of the handover request message from the femtocell base station.

The handover control unit may be configured to detect a cell identifier of the femtocell base station from the handover request message, to compare an organization identifier of a target base station included in the handover request message with organization identifiers of the handover-allowable base stations stored associated with the femtocell base station, and to transmit the handover approval message to the femtocell base station when one of organization identifier of the handover-allowable base stations is substantially identical to the organization identifier of the target base station in the handover request message,

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF IRE INVENTION

Figure 1:
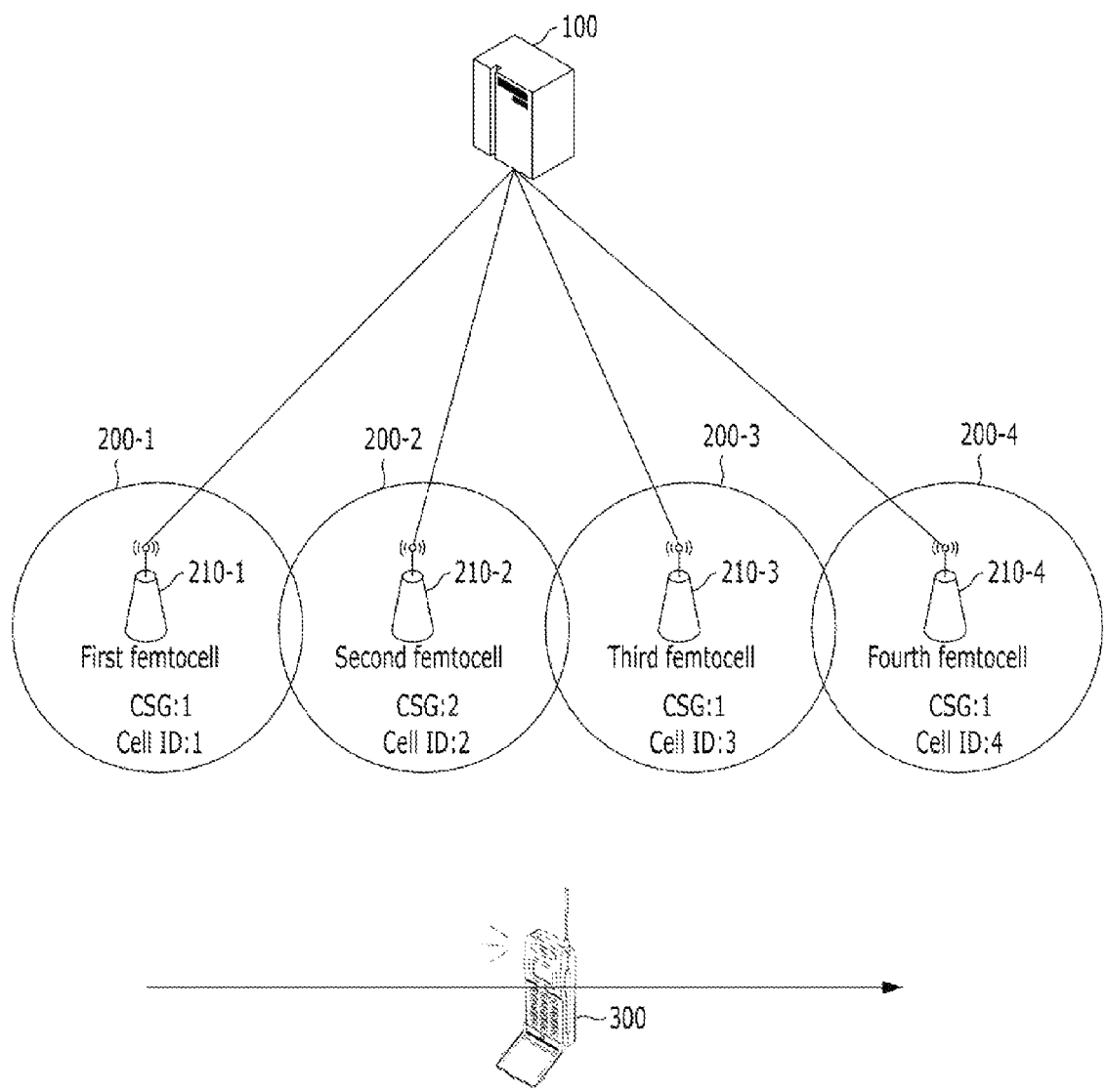
FIG. 1 shows a communication environment including a plurality of femtocells having different CSG identifiers in accordance with an embodiment of the present invention.

Reference will now be made in detail to embodiments of the present invention, examples of which are illustrated in the accompanying drawings, wherein like reference numerals refer to like elements throughout. The embodiments are described below, in order to explain the present invention by referring to the figures.

Embodiments of the present invention will be described as being applied to femtocell and a femtocell base station. However, the present invention is not limited to the femtocell. Embodiment of the present invention can be applied to any other cells including a macrocell and a macrocell base station.

For convenience and ease of understanding, hetero femtocells and hetero femtocell base stations may denote femtocells and femtocell base stations having different CSG identifiers throughout the specification. Furthermore, handover-allowable hetero femtocell base stations may denote femtocell base stations that enabling handover of user equipment between hetero femtocell base stations have different CSG identifiers.

In accordance with an embodiment of the present invention, handover of user equipment is enabled between femtocell base stations having different CSG identifiers. Particularly, femtocell base stations might perform handover of user equipment to another femtocell base station separated by a comparatively short distance but having different CSG identifiers. Hereinafter, a system and method for enabling user equipment handover between femtocells having different CSG identifiers will be described with reference to FIG. 1 through FIGS, 4A and 4B.

FIG. 1 shows a communication environment including a plurality of femtocells having different CSG identifiers in accordance with an embodiment of the present invention.

Referring to FIG. 1, femtocell gateway 100 may be coupled with a plurality of femtocell base stations 210-1 to 210-4. Although four femtocell base stations 210-1 to 210-4 are coupled to femtocell gateway 100 in FIG. 1, the present invention is not limited thereto. Each one of femtocell base stations 210-1 to 210-4 may have a closed subscriber group (CSG) identifier and a cell identifier (Cell ID). For convenience and ease of understanding, user equipment 300 is initially coupled to first femtocell base station 210-1 and includes an ACL with a CSG identifier of 1, but not a CSG identifier of 2. Furthermore, first femtocell base station 210-1 may have a CSG identifier of 1 and a cell identifier of 1. Second femtocell base station 210-2 may have a CSG identifier of 2 and a cell identifier of 2. Third femtocell base station 210-3 may have a CSG identifier of 1 and a cell identifier of 3. Fourth femtocell base station 210-4 may have a CSG identifier of 1 and a cell identifier of 4. Each one of femtocell base stations 210-1 to 210-4 provides for an associated femtocell 200-1 to 200-4, respectively.

According to the ACL of user equipment 300 and absent operation of the present invention, user equipment 300 might typically be denied access to user resources of second femtocell 200-2 according to a typical, prior art femtocell access control scheme. Consequently, user equipment 300 would be denied handover from first femtocell 200-1 to second femtocell 200-2 according to the typical prior art femtocell handover procedure. When user equipment 300 traveled from first femtocell 200-1 to third femtocell 200-3, a communication link of user equipment 300 passing through second femtocell 200-2 would then be disconnected.

In order to overcome such a defect of the typical prior art femtocell handover procedure, user equipment in accordance with an embodiment of the present invention is provided with a handover procedure between femtocells having different CSG identifiers. Particularly, each femtocell base station may detect neighbor femtocell base stations i) having different CSG identifiers but ii) permitted to perform handover (termed herein as "handover-allowable"). Each femtocell base station transmits a list of the detected handover-allowable hetero femtocell base stations to a femtocell gateway. The femtocell gateway may store the list of the handover-allowable hetero femtocell base stations associated with each femtocell in a memory. When the femtocell gateway receives a handover request between hetero femtocell base stations which are assigned with different CSG identifiers, the femtocell gateway may allow the handover request based on the stored list of the handover-allowable hetero femtocell base stations. Hereinafter, a femtocell base station for allowing handover between femtocell base stations having different CSG identifiers will be described with reference to FIG. 2.

Figure 2:
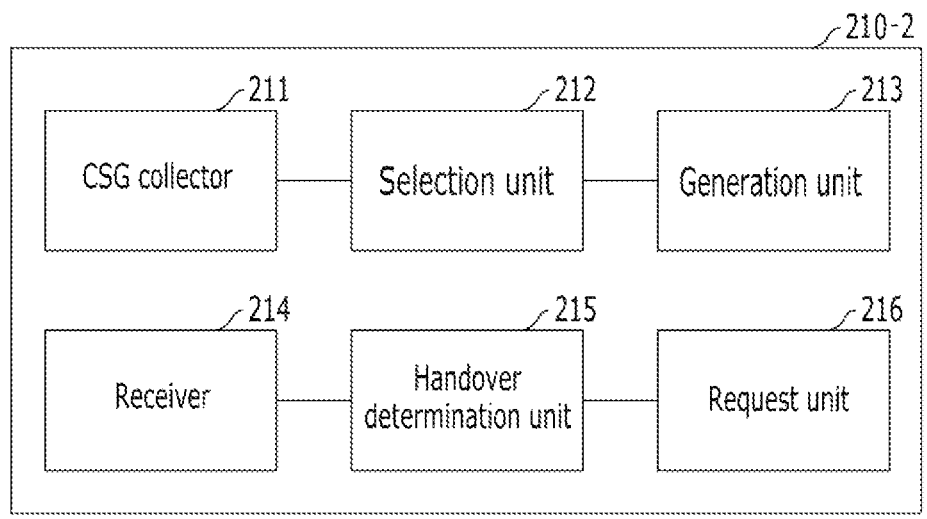
FIG. 2 shows a femtocell base station in accordance with an embodiment of the present invention.

FIG. 2 shows a femtocell base station in accordance with an embodiment of the present invention.

Referring to FIG. 2, femtocell base station 210-2 may include CSG collector 211, selection unit 212, generation unit 213, receiver 214, handover determination unit 215, and request unit 216. For convenience and ease of understanding, second femtocell base station 210-2 will be described representatively. Femtocell base stations 210-1, 210-3, and 210-4 may have a structure similar to that of femtocell base station 210 and operate in an analogous manner.

CSG collector 211 may collect CSG identifiers of neighbor femtocell base stations. Such collection operation may be performed regularly at a given interval. For example, CSG collector 211 of femtocell base station 210-2 may scan and receive signals transmitted from neighbor base stations 210-1, 210-3, and 210-4 in a listening mode. The signals may be a pilot signal from neighbor base stations 210-1, 210-3, and 210-4. Based on the received signal, CSG collector 211 may collect CSG identifiers of neighbor femtocell base stations 210-1 and 210-3.

Selection unit 212 may find neighbor femtocell base stations femtocell base stations having CSG identifier different from that of second femtocell base stations 210-2 and separated by a comparatively short distance, which may be referred to as handover-allowable hetero femtocell base stations. First, selection unit 212 may detect femtocell base stations having a CSG identifier different from second femtocell base station 210-2 based on the collected CSG identifiers. That is, hetero femtocell base stations may be detected first. Second, selection unit 212 may select two or more hetero femtocell base stations having an identical CSG identifier to each other and transmitting a signal with signal intensity greater than reference signal intensity from the detected hetero femtocell base stations. These hetero femtocell base stations may be separated from second femtocell base station 210-2 by a comparatively short distance and have a greater probability that user equipment handover will occur from or back to these femtocell base stations in a short period time. Selection unit 212 may determine the selected hetero femtocell base stations as the handover-allowable hetero femtocell base stations.

Generation unit 213 may generate a handover acceptance request message including handover-allowable femtocell information and transmit the handover acceptance request message to femtocell gateway 100. The handover-allowable femtocell information may include information on of the handover-allowable hetero femtocell base stations, such as cell identifiers and CSG identifiers of the handover-allowable hetero femtocell base stations. The handover acceptance request message may notify gateway 100 that second femtocell base station 210-2 will allow user equipment accessing the handover-allowable hetero femtocell base station to second femtocell base station 210-2 although the user equipment does not have a CSG identifier of second femtocell base station 210-2 in the ACE Generation unit 213 may generate and transmit the handover acceptance request message whenever CSG collector 211 regularly collects CSG identifiers.

Receiver 214 may receive measurement results from various user equipment coupled to second femtocell base station 210-2. The measurement results may include signal intensities of signals transmitted from neighbor femtocell base stations.

Handover determination unit 215 may determine whether to hand over coupled user equipment to another femtocell base station based on the measurement result. Furthermore, handover determination unit 215 may determine a target femtocell base station of the coupled user equipment based on a cell identifier of the target femtocell base station in a handover command message upon the receipt of the handover command message from femtocell gateway 100, Request unit 216 may genera a handover request message to femtocell gateway 100 when handover determination unit 215 specifies handover of user equipment to a target femtocell base station. The handover request message may include identification information of the target femtocell base station.

Hereinafter, femtocell gateway 100 for allowing a handover between femtocells having different CSG identifiers will be described with reference to FIG. 3.

Figure 3:
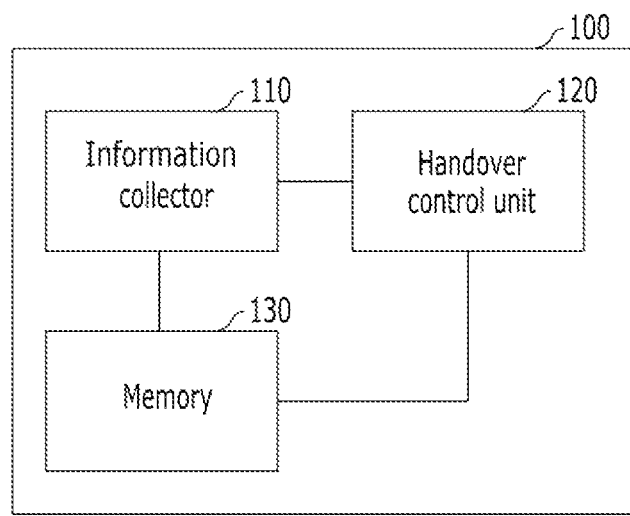
FIG. 3 shows a gateway in accordance with an embodiment of the present invention.

FIG. 3 shows a gateway in accordance with an embodiment of the present invention.

Referring to FIG femtocell gateway 100 may include information collector 110, handover control unit 120, and memory 130.

Information collector 110 may receive at least one handover acceptance request message from femtocell base stations coupled to femtocell gateway 100 and collect the handover-allowable femtocell information included in the handover acceptance request message. Furthermore, information collector 110 may store the collected handover-allowable femtocell information in memory 130. The handover-allowable femtocell information may include cell identifiers and CSG identifiers of handover-allowable hetero femtocell base stations. In response to the handover acceptance request message, information collector 110 may transmit the approval message to femtocell base stations. Accordingly, upon the receipt of the handover acceptance request message, femtocell gateway 100 might generally approve a handover request from handover-allowable hetero femtocell base stations to second femtocell base station 210-2 In addition, information collector 110 may receive a handover request message from femtocell base stations coupled to femtocell gateway 100 and collect information on identifiers of various, coupled user equipment, CSG identifiers of femtocell base stations, the measurement result, and cell identifiers of neighbor femtocell base stations.

Memory 130 may store the collected information by information collector 120. For example, memory 130 may store the handover-allowable femtocell information and information on identifiers of various, coupled user equipment, CSG identifiers of femtocell base stations, the measurement result, and cell identifiers of neighbor femtocell base stations. Memory 130 may provide the stored information to handover control unit 120.

Handover control unit 120 may initiate an access check procedure upon the receipt of a handover request message. Handover control unit 120 may determine to whether to approve the handover request or not. For example, handover control unit 120 may detect a cell identifier of a target femtocell base station from the handover request message and determine whether handover-allowable femtocell information is stored in memory 130 corresponding to the detected cell identifier of the target femtocell base station. When the handover-allowable femtocell information of the target femtocell base station is stored in memory 130, handover control unit 120 may determine whether a CSG identifier of a serving femtocell base station is included in a list of handover-allowable femtocell base stations associated with the target femtocell base station. When a CSG identifier of a serving femtocell base station is included in a list of handover-allowable femtocell base stations associated with the target femtocell base station, handover control unit 120 may approve the handover request and transmit a handover request message the target base station. Otherwise, handover control unit 120 may deny the handover request.

Figure 4A:
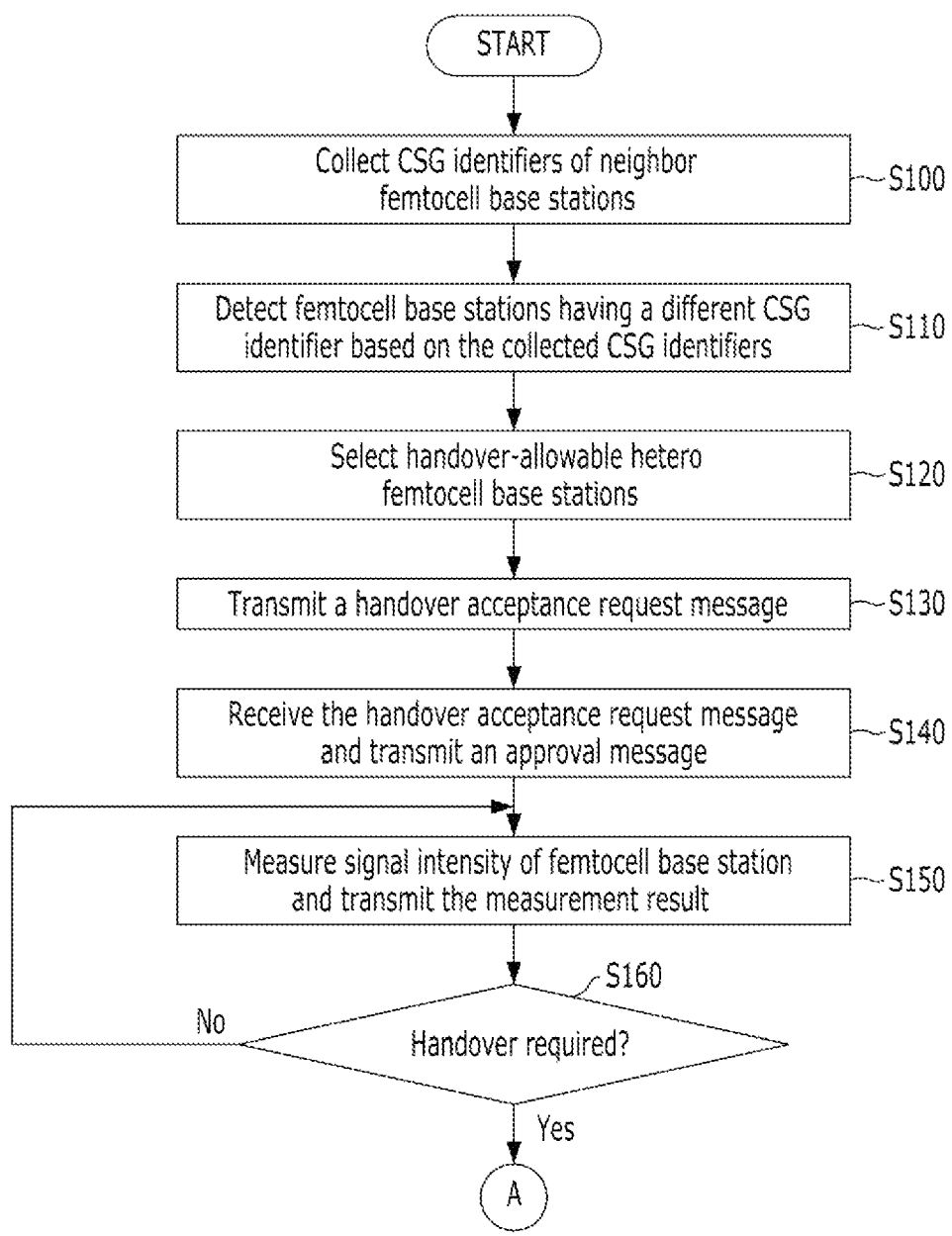
FIGS. 4A and 4B illustrate a method for allowing user equipment to be handed over between femtocell base stations having different CGS identifier in accordance with an embodiment of the present invention.
Figure 4B:
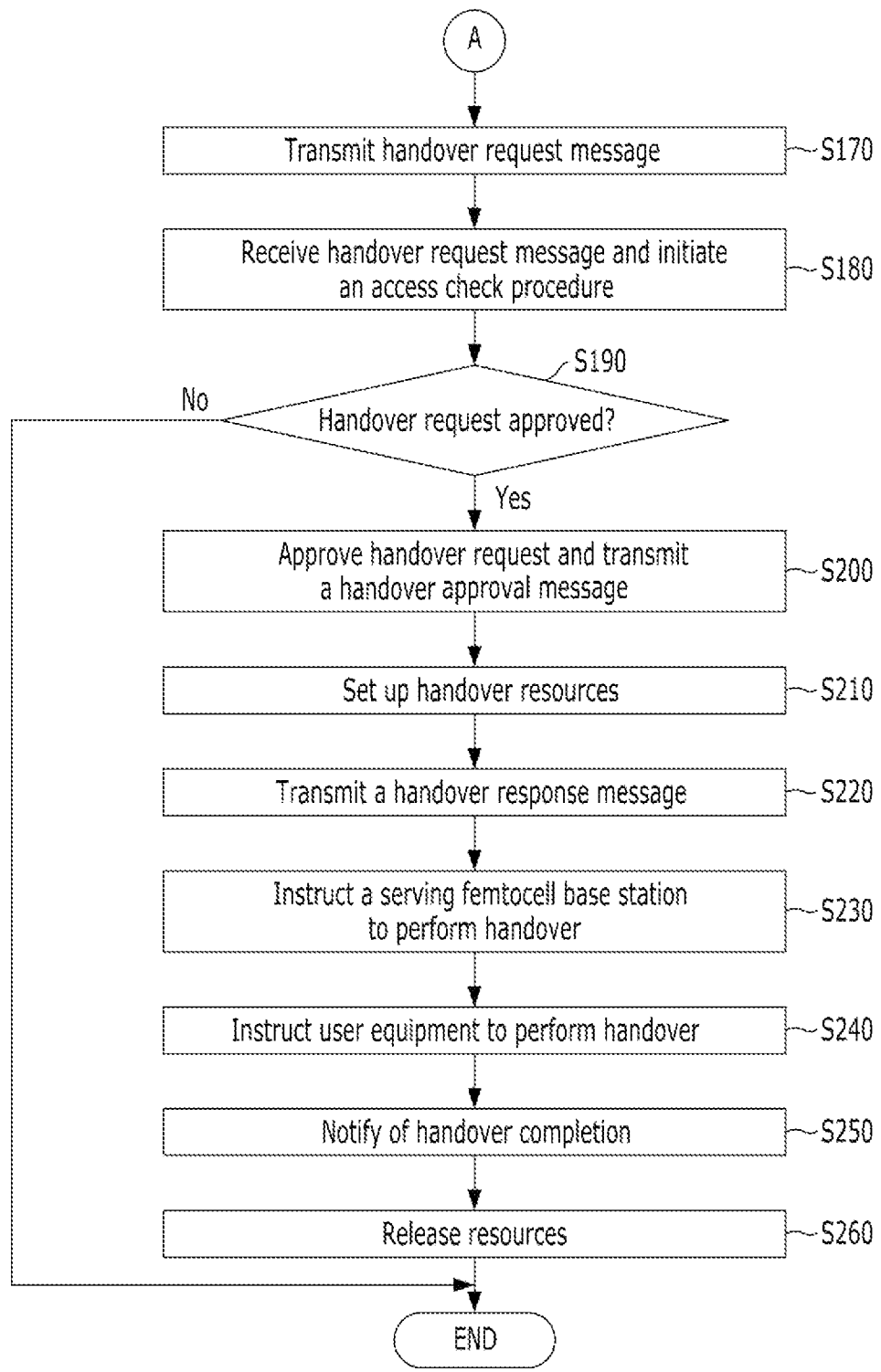

FIGS. 4A and 4B illustrate a method for allowing handover for user equipment between femtocell base stations having different CGS identifier in accordance with an embodiment of the present invention.

In order to enable a femtocell base station to hand user equipment over to another femtocell base stations having a different CGS identifier, each femtocell base station may need to generate a list of neighbor femtocell base stations having a different CGS but to be allowable for handing over user equipment. After generating the list, each femtocell base station may transmit the generated list to a femtocell gateway. Based on the list, the femtocell gateway may approve a handover request between femtocell base stations having different CGS identifiers. For convenience and ease of understanding, a femtocell base station having a different CGS may be referred to as a hetero femtocell base station and a hetero femtocell base station allowed for handover may be referred to as handover-allowable hetero femtocell base station, hereinafter.

In order to enable handover of user equipment between femtocell base stations having different CGS identifiers, each femtocell base station might require identification of handover-allowable hetero femtocell base stations. For example, a femtocell base station may search for neighbor femtocell base stations having a different CSG identifier and transmitting a signal with signal intensity greater than a reference signal intensity. Each femtocell base station may perform following steps for finding handover-allowable hetero femtocell base stations.

At step S100, closed subscriber group (CSG) identifiers of neighbor femtocell base stations may be collected. For example, second femtocell base station 210-2 may collect CSG identifiers of neighbor base stations 210-1, 210-3, and 210-4. Particularly, second femtocell base station 210-2 may scan and receive signals transmitted from neighbor base stations 210-1, 210-3, and 210-4 in a listening mode. The signals may be a pilot signal. Based on the received signal, second femtocell base station 210-2 may collect CSG identifiers of neighbor femtocell base stations 210-1 and 210-3. As described above, second femtocell base station 210-2 may have a CSG identifier different from those of neighbor femtocell base stations 210-1, 210-3, and 210-4.

At step S110, femtocell base stations having a different CSG identifier may be detected based on the collected CSG Identifier as hetero femtocell base stations. For example, second femtocell base stations 210-2 may detect femtocell base stations having a CSG identifier different from that of second femtocell base stations 210-2 based on the collected CSG identifiers. Since first, third, and fourth femtocell base stations 210-1, 210-3, and 210-4 have the different CSG identifiers, second femtocell base stations 210-2 may define first, third, and fourth femtocell base stations 210-1, 210-3, and 210-4 as the hetero femtocell base stations, At step S120, handover-allowable hetero femtocell base stations may be selected from the detected hetero femtocell base stations. That is, from hetero femtocell base stations, each femtocell base station may select (as the handover-allowable hetero femtocell base stations) femtocell base stations having a greater probability of frequent handover of user equipment from a serving femtocell base station to a target femtocell base station and back to the serving femtocell base station. For example, when two or more hetero femtocell base stations have an identical CSG identifier to each other and transmit a signal having signal intensity greater than reference signal intensity from the detected hetero femtocell base stations, these hetero femtocell base stations may be within a comparatively close distance from second femtocell base station 210-2 and have a greater probability that user equipment of frequent handover between these femtocell base stations in a short period time. For example, second femtocell base station 210-2 may select first, third, and fourth femtocell base stations 210-1, 210-3, and 210-4 because first, third, and fourth femtocell base stations 210-1, 210-3, and 210-3 have the identical CSG identifier of 1 but different from a CSG identifier of second femtocell base station 210-2. Then, second femtocell base station 210-2 may compare signal intensity of a signal transmitted each one of first, third, and fourth femtocell base stations 210-1, 210-3, and 210-4 with the reference signal intensity. For convenience and ease of understanding, by example first and third femtocell base stations 210-1 and 210-3 might transmit signals with signal intensity greater than the reference signal intensity. Under this example, second femtocell base station 210-2 may finally select first and third femtocell base stations 210-1 and 210-3 as the handover-allowable hetero femtocell base stations. That is, second femtocell base station 210-2 may allow handover of user equipment from first and third femtocell base stations 210-1 and 210-3 although an ACL of the user equipment does not necessarily include information of first and third femtocell base stations. Accordingly, second femtocell base station 210-2 may select first and third femtocell base stations 210-1 and 210-3 as the handover-allowable hetero femtocell base stations.

At step S130, a handover acceptance request message may be transmitted. For example, second femtocell base station may generate the handover acceptance request message including handover-allowable femtocell information and transmit the handover acceptance request message to femtocell gateway 100. The handover-allowable femtocell information may include information on the handover-allowable hetero femtocell base stations, such as cell identifiers and CSG identifiers of the handover-allowable hetero femtocell base stations. The handover acceptance request message may notify gateway 100 that second femtocell base station 210-2 will allow user equipment to be handed over from the handover-allowable hetero femtocell base station although the user equipment does not necessarily have a CSG identifier of second femtocell base station 210-2 in the ACL.

At step S140, the handover acceptance request message may be received and an approval message may be transmitted. For example, femtocell gateway 100 may receive the handover acceptance request message from second femtocell base station 210-2. Femtocell gateway 100 may store the handover-allowable femtocell information included in the handover acceptance request message in memory 130. The handover-allowable femtocell information may include cell identifiers and CSG identifiers of handover-allowable hetero femtocell base stations. In response to the handover acceptance request message, femtocell gateway 100 may transmit the approval message to second femtocell base station 210-2. Accordingly, upon the receipt of the handover acceptance request message, femtocell gateway 100 will approve a handover request from handover-allowable hetero femtocell base stations to second femtocell base station 210-2, At step S150, user equipment may measure signal intensity of femtocell base stations and the measurement result may be transmitted. For example, user equipment 300 accessing first femtocell base station 210-1 may measure signal intensities of femtocell base stations relatively near user equipment 300. Particularly, user equipment 300 may measure signal intensities of first femtocell base station 210-1, second femtocell base station 210-2, and third femtocell base station 210-3. User equipment 300 may transmit the measurement result to first femtocell base station 210-1.

At step S160, determination may be made based on the measurement result whether to perform handover of the user equipment to another femtocell base station. For example, first femtocell base station 210-1 may receive the measurement result from user equipment 300 and determine whether to perform handover of user equipment 300 from first femtocell base station 210-1 to second femtocell base station 210-2.

At step S170, a handover request message may be transmitted to gateway 100 when handover is required (Yes—S160). For example, when user equipment 300 is leaving first femtocell 200-1 and entering second femtocell 200-2, first femtocell base station 210-1 may determine to enable handover of user equipment 300 to second femtocell base station 210-2 that has a CSG identifier different from that of first femtocell base station 210-1. In this case, first femtocell base station 210-1 may transmit a handover request message to femtocell gateway 100. 1he handover request message may include a CSG identifier of first femtocell base station as a serving femtocell base station, identification information of second femtocell base station as a target femtocell base station, and information on user equipment. The user equipment information may include an ACL of user equipment 300 as well as identification information of user equipment 300. When handover is not required (No—S160), the step S150 may be performed again.

At step S180, the handover request message may be received and an access check procedure may be initiated. For example, femtocell gateway 100 may receive the handover request message from first femtocell base station 210-1. Femtocell gateway 100 may collect information included in the handover request message, such as a CSG identifier of first femtocell base station as a serving femtocell base station, identification information of second femtocell base station as a target femtocell base station, and information on user equipment. In addition, femtocell gateway 100 may initiate the access check procedure based on the information included in the handover request message.

At step S190, determination may be made as to whether to approve the handover request. For example, femtocell gateway 100 may determine whether to approve the handover request from first femtocell base station 210-1 based on the information of the handover request message and the handover-allowable femtocell information stored in memory 130. Particularly, femtocell gateway 100 may detect a cell identifier of a target femtocell base station from the handover request message and determine whether handover-allowable femtocell information is stored in memory 130 corresponding to the detected cell identifier of the target femtocell base station. Since the target femtocell base station is second femtocell base station 210-2, femtocell gateway 100 may determine whether handover-allowable femtocell information of second femtocell base station 210-2 is stored in memory 130.

When the handover-allowable femtocell information of the target femtocell base station is stored in memory 130, femtocell gateway 100 may determine whether a CSG identifier of a serving femtocell base station is included in a list of handover-allowable femtocell base stations associated with the target femtocell base station. Since the service femtocell base station is first femtocell base station 210-1 and the target femtocell base station is second femtocell base station 210-2, femtocell gateway 100 may determine whether the CSG identifier of first femtocell base station 210-1 is included in the handover-allowable femtocell base stations associated with second femtocell base station 210-2.

When a CSG identifier of a serving femtocell base station is included in a list of handover-allowable femtocell base stations associated with the target femtocell base station, the handover request may be approved (Yes—S190) and a handover request message may be transmitted the target base station at step S200. For example, femtocell gateway 100 may approve the handover request from first femtocell base station 210-1 and transmit a handover request message to second femtocell base station 210-2. Otherwise, the handover request may be denied (No—S190) and the process ends.

At step S210, handover resources may be set up in response to the handover request message. For example, second femtocell base station 210-2 may receive the handover request message from femtocell gateway 100 and set up handover resources for initiating a handover procedure from first femtocell base station 210-1 to second femtocell base station 210-2.

At step S220, a handover response message may be transmitted. For example, second femtocell base station 210-2 may transmit the handover response message to femtocell gateway 100 in response to the handover request message.

At step S230, the serving femtocell base station may be instructed to perform handover to the target femtocell base station. For example, femtocell gateway 100 may instruct first femtocell base station 210-1 to perform handover to second femtocell base station 220-1. At step S240, user equipment may be instructed to perform handover to the target femtocell base station. For example, user equipment 300 may release connection to first femtocell base station 210-1 and access second femtocell base station 210-2. At step S250, the target femtocell base station may notify the system of handover completion. For example, second femtocell base station 210-2 may notify femtocell gateway 100 of completion of handover from first femtocell base station 210-1 to second femtocell base station 210-2. At step S260, the source femtocell base station may be instructed to release resources allocated to user equipment. For example, femtocell gateway 100 may instruct first femtocell base station 210-1 to release connection to user equipment 300.

As described above, handover of user equipment may be allowed between femtocell base stations having different CSG identifiers. Furthermore, a femtocell base station may be enabled to perform handover of user equipment to another femtocell base station having a different CSG identifier. Therefore, a seamless femtocell service may be provided to user in a communication environment including a plurality of hetero femtocells gathered in such a comparatively small area.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form, Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over sonic transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims, in addition to variations and modifications in the component parts and/or arrangements, alternative uses will also be apparent to those skilled in the art.

What is claimed is:

1. A method for allowing handover of user equipment between base stations belonging to different organizations, the method comprising:
   collecting, by a first base station, information corresponding to identifiers of neighbor base stations;
   selecting handover-allowable base stations from the neighbor base stations having an organization identifier different from that of the first base station; and
   enabling handover for the user equipment from the first base station to a second base station based on the selected handover-allowable base stations for a handover request of the user equipment from the first base station to the second base station,
   wherein the selecting handover-allowable base stations includes:
      selecting, from the neighbor base stations, base stations having an organization identifier different from the first base station as hetero base stations;
      selecting, from the selected hetero base stations, base stations having an organization identifier identical to those of the selected hetero base stations; and
      transmitting a signal with signal intensity greater than reference signal intensity, as the handover-allowable base stations.

2. The method of claim 1, wherein the collecting information includes:
   scanning and receiving signals transmitted from the neighbor base stations in a listening mode;
   collecting each identifier including the organization identifier from the scanned signals; and
   storing the collected identifiers in a memory.

3. The method of claim 1, comprising:
   generating a handover acceptance request message to include information on the handover-allowable base stations; and
   transmitting the generated message to a gateway.

4. The method of claim 3, wherein the enabling handover includes:
   transmitting, by the first base station, a handover request message to the gateway when the first base station permits handover of the user equipment from the first base station to the second base station; and
   performing handover for the user equipment to the second base station having the organization identifier different from that of the first base station upon receipt of a handover approval message from the gateway.

5. The method of claim 4, comprising:
   receiving, by the gateway, the handover acceptance request message, extracting the information on the handover-allowable base stations from the received handover acceptance request message, and storing the extracted information on the handover-allowable base stations; and
   determining the enabling of handover for the user equipment from the first base station to the second base station based on the handover-allowable base stations included in the handover acceptance request message from the first base station when the gateway receives the handover request message from the first base station.

6. The method of claim 5, wherein the determining the enabling includes:
   detecting a cell identifier of the first base station from the handover request message;
   comparing an organization identifier of a target base station included in the handover request message with organization identifiers of the handover-allowable base stations stored associated with the first base station; and
   transmitting the handover approval message to the first base station when one of organization identifier of the handover-allowable base stations is identical to the organization identifier of the target base station in the handover request message.

7. The method of claim 1, wherein the organization identifier is a closed subscriber group (CSG) identifier.

8. The method of claim 1, wherein the base stations are femtocell base stations, the first base station is a femtocell base station, and the second base station is a femtocell base station.

9. A method for enabling a femtocell base station to hand over user equipment to another femtocell base station belonging to a different organization, the method comprising:
   receiving, by a gateway, a handover acceptance request message from a first base station coupled to the gateway; and
   determining allowing a handover request from the first base station to a second base station based on information stored in the handover acceptance request message received from the first base station, wherein the determining includes:
receiving the handover request from the first base station to the second base station;
detecting a cell identifier of the first base station from the handover request message;
comparing a CSG identifier of the second base station included in the handover request message with stored CSG identifiers of the handover-allowable base stations associated with the cell identifier of the first base station; and
transmitting a handover approval message to the first base station when one of CSG identifiers of the handover-allowable base stations is identical to the CSG identifier of the target base station in the handover request message.

10. The method of claim 9, further comprising:
extracting handover-allowable base station information from the received handover acceptance request message; and
storing the extracted handover-allowable base station information associated with identifier information of the first base station.

11. The method of claim 10, wherein:
the handover-allowable base station information includes information on handover-allowable base stations of the first base station; and
the handover-allowable base stations are neighbor base stations of the first base station which have a closed subscriber group (CSG) identifier different from that of the first base station and transmit signals with signal intensity greater than reference signal intensity.

12. A femtocell base station comprising:
a collector configured to collect information corresponding to identifiers of neighbor femtocell base stations;
a selection unit configured to select handover-allowable base stations from the neighbor femtocell base stations having an organization identifier different from that of the femtocell base station; and
a handover determination unit configured to enable handover for user equipment from the femtocell base station to a second femtocell base station based on the selected handover-allowable base stations when the user equipment requests handover from the femtocell base station to the second femtocell base station,
wherein the selection unit is configured to:
select, from the neighbor femtocell base stations, one or more neighbor femtocell base stations having an organization identifier different from the femtocell base station as hetero femtocell base stations;
select, from the selected hetero base stations, base stations having an organization identifier identical to those of the selected hetero base stations; and
transmit a signal with signal intensity greater than reference signal intensity, as the handover-allowable base stations.

13. The femtocell base station of claim 12, wherein the collector is configured to:
scan and receive signals transmitted from neighbor base stations in a listening mode;
collect each identifier including the organization identifier from the scanned signals; and
store the collected identifiers in a memory.

14. The femtocell base station of claim 12, further comprising a generation unit configured to:
generate a handover acceptance request message to include information on the handover-allowable base stations; and
transmit the generated message to a gateway.

15. The femtocell base station of claim 14, wherein the handover determination unit is configured to:
transmit a handover request message to the gateway when determining handing over the user equipment to the second femtocell base station; and
perform handing over the user equipment to the second femtocell base station having the organization identifier different from that of the femtocell base station upon receipt of a handover approval message from the gateway.

16. The femtocell base station of claim 15, wherein the gateway includes:
an information collector configured to receive the handover acceptance request message, to extract the information on the handover-allowable base stations from the received handover acceptance request message, and to store the extracted information on the handover-allowable base stations; and
a handover control unit configured to determine whether to allow handover of the user equipment from the femtocell base station to the second femtocell base station based on the handover-allowable base stations included in the handover acceptance request message from the femtocell base station upon the receipt of the handover request message from the femtocell base station.

17. The femtocell base station of claim 16, the handover control unit is configured to:
detect a cell identifier of the femtocell base station from the handover request message;
compare an organization identifier of a target base station included in the handover request message with organization identifiers of the handover-allowable base stations stored associated with the femtocell base station; and
transmit the handover approval message to the femtocell base station when one of organization identifier of the handover-allowable base stations is substantially identical to the organization identifier of the target base station in the handover request message.

* * * * *